US008630500B2

(12) United States Patent
Morard et al.

(10) Patent No.: US 8,630,500 B2
(45) Date of Patent: Jan. 14, 2014

(54) METHOD FOR THE ENCODING BY SEGMENTATION OF A PICTURE

(75) Inventors: Jean-Pierre Morard, Rueil Malmaison (FR); Stéphane Vialle, Rueil Malmaison (FR); Olivier Pietquin, Rueil Malmaison (FR)

(73) Assignee: Sagemcom Broadband SAS, Rueil-Malmaison (FR)

( * ) Notice: Subject to any disclaimer, the term of this patent is extended or adjusted under 35 U.S.C. 154(b) by 363 days.

(21) Appl. No.: 13/141,499

(22) PCT Filed: Dec. 23, 2009

(86) PCT No.: PCT/FR2009/052681
§ 371 (c)(1),
(2), (4) Date: Jul. 13, 2011

(87) PCT Pub. No.: WO2010/072983
PCT Pub. Date: Jul. 1, 2010

(65) Prior Publication Data
US 2011/0262051 A1    Oct. 27, 2011

(30) Foreign Application Priority Data

Dec. 23, 2008 (FR) ...................................... 08 59018

(51) Int. Cl.
*G06K 9/36* (2006.01)
(52) U.S. Cl.
USPC ........................................................ 382/232
(58) Field of Classification Search
USPC ................... 382/232–253, 166, 173, 199; 375/240.01–240.29
See application file for complete search history.

(56) References Cited

U.S. PATENT DOCUMENTS

| 6,198,850 | B1 * | 3/2001 | Banton | 382/239 |
| 6,252,994 | B1 * | 6/2001 | Nafarieh | 382/253 |
| 6,625,323 | B2 * | 9/2003 | Henderson et al. | 382/251 |
| 6,701,020 | B2 * | 3/2004 | Chrysafis et al. | 382/239 |
| 7,139,434 | B2 * | 11/2006 | Schwartz | 382/233 |
| 7,218,784 | B1 * | 5/2007 | Zeck et al. | 382/232 |
| 7,376,278 | B2 * | 5/2008 | Iwamura | 382/236 |
| 8,422,778 | B2 * | 4/2013 | Matsuoka | 382/166 |
| 2008/0175475 | A1 | 7/2008 | Sung | |

FOREIGN PATENT DOCUMENTS

| EP | 0 933 947 | 8/1999 |
| EP | 1 152 594 | 6/2008 |
| WO | WO 02/075661 | 9/2002 |

OTHER PUBLICATIONS

International Search Report as issued for PCT/FR2009/052681.

* cited by examiner

*Primary Examiner* — Ishrat I Sherali
(74) *Attorney, Agent, or Firm* — Pillsbury Winthrop Shaw Pittman LLP

(57) ABSTRACT

A method for encoding an image, the encoding being a mixed encoding with the possibility of using a first lossless compression type, and a second lossy compression type, the method including: dividing the image into a plurality of elementary blocks; determining which elementary blocks have a high level of detail; allocating the first type of compression to each elementary block that has a high level of detail; allocating the second compression type to each elementary block that does not have a high level of detail; applying the first type of compression to each elementary block to which the first compression type has been allocated; applying the first compression type to each elementary block directly surrounded by two elementary blocks to which the first compression type has been allocated.

6 Claims, 1 Drawing Sheet

METHOD FOR THE ENCODING BY SEGMENTATION OF A PICTURE

CROSS REFERENCE TO RELATED APPLICATIONS

This application is the U.S. National Stage of PCT/FR2009/052681, filed Dec. 23, 2009, which in turn claims priority to French patent application Ser. No. 08/59018, filed Dec. 23, 2008, the entire contents of all applications are incorporated herein by reference in their entireties.

TECHNICAL FIELD OF THE INVENTION

The object of the present invention is a method of encoding by video image segmentation. In particular, the purpose of the invention is to improve the rendering quality of an image that had previously been subject to a compression operation in order to limit the data rate necessary for storing and/or transmitting data relative to the image under consideration once it is encoded. The encoding operation according to the invention is carried out in particular by ensuring the possibility of restitution of the maximum details for the image zones corresponding to zones known as MMI (Man-Machine Interface) with relation to other zones of the image under consideration corresponding to photo, video, etc., zones.

The field of the invention is, in general, that of video image compression. By way of example, without limiting the scope of the object of the invention, the field of the invention will be more particularly detailed in a context essentially involving the compression standard known as H264, without this aspect being limiting with regard to the scope of the invention. In fact, other compression standards, for example of the VC1 or DivX type, even if they are less advantageous in certain contexts, may be utilized in the embodiment of the method according to the invention.

The different video coding standards are all based on the same major principles. On the one hand, they are based on the redundancy of temporal or spatial data, in order to reduce the quantity of data, without necessarily introducing losses. On the other hand, some data or details are eliminated, which introduces losses in the restored image, said losses generally being targeted with relation to the psychovisual properties. In fact, some image details are perceived by the eye very little or not at all and may therefore be omitted. In this way a compressed video stream is obtained. The main steps of video compression are thus as follows:

- Coding the image to be encoded in luminance-chrominance;
- Division of the image into macro-blocks, or elementary blocks, that are rectangular regions with a size of between 4*4 and 16*16 pixels;
- Motion estimation;
- Motion compensation;
- Frequency transform: DCT (Discrete Cosine Transformation) is applied to each elementary block. Such a transform enables a frequency representation of the image to be obtained.
- Quantification; Data from the DCT are quantified by being coded on a limited number of bits. This is where the loss of data takes place.
- Entropy coding. In such coding, the more often a given value appears, the more it will be coded on a small number of bits.

The context in which the present invention will be described will be that of the placement of media center type applications, that consist of the remote utilization of a computer in a residence in various points of said residence, in order to have various services that may be utilized through workstations, for example a digital television decoder, distributed in the habitat. For this purpose, it is necessary to transfer various data, particularly video images, across the network constituted of the computer, the clients and the connections connecting them; Image compression is thus a necessity for ensuring good operation of the media center type application distributed over a network.

TECHNOLOGICAL BACKGROUND OF THE INVENTION

Standard H264 provides two types of compression, illustrated in FIG. 1. A first compression type 100, known as lossless compression mode or lossless compression, obtains, from an original image 103, a restored image 104 after a compression phase 105 that does not lead to any loss in the restored image 104. A second type of compression 101, known as lossy compression mode or lossy compression, obtains, from an original image 106, a restored image 107 after a compression phase 108 that leads to a loss of data in the restored image 107 with relation to the original image 106, a data loss that manifests in a reduction in image quality, notably in terms of sharpness.

Standard H264 is preferred for the transmission of video across the network created. But this standard is, as explained previously, likely to produce data losses during compression operations occurring during video data encoding, in particular. Basically, these losses are considered to be not really discernable to the human eye; this was the case, in particular, when the video data to be encoded and transmitted were only of the photo or television broadcast image types, for example. However, in some cases, the defects introduced by these data losses may become very visible. This is the case in particular with images such as buttons, menus, or any other element containing text and many details.

More generally, when an image is compressed to gain transmission time or storage space, a certain loss rate is made in order to obtain a better compression rate. Such being the case, these losses, which do not pose problems for video visualization, are an inconvenience for image renderings of the graphic MMI type. In fact, more particularly, MMI renderings must be produced more carefully since the image is very often static or slightly animated, and the defects therein are perceptible. On the other hand, when an end user passes from a PC type station to an application on the television, his assessment of the identical content is more critical.

GENERAL DESCRIPTION OF THE INVENTION

The method according to the invention proposes a solution to the problems and disadvantages that have just been stated. In the invention, a solution to improve the rendering quality of the image to be restored is proposed. For this purpose, in the invention, one seeks in particular to distinguish image zones corresponding to MMI, whose restoration quality must be optimized, and image zones corresponding to photo, video, image, etc., type content, for which lossy compression may be accepted. Depending on the nature of the zones distinguished, either a lossless compression mode, or a lossy compression mode is then applied.

The invention thus essentially relates to a method for encoding an image, said encoding being a mixed encoding with the possibility of using a first lossless compression type, and a second lossy compression type, said method comprising the operation consisting of dividing the image into a plurality of elementary blocks;

characterized in that said method comprises different additional steps consisting of:

determining the elementary blocks having a high level of detail;

allocating the first compression type to each elementary block that has a high level of detail;

allocating the second compression type to each elementary block that does not have a high level of detail.

The method according to the invention may comprise, in addition to the main steps that have just been mentioned in the previous paragraph, one or more additional characteristics from among the following:

the step consisting of determining the elementary blocks having a high level of detail comprises different operations consisting of, for each elementary block under consideration:

performing spatial filtering to obtain a frequency representation;

measuring a high-frequency component level of the frequency representation;

if the high-frequency component level is greater than a previously determined threshold, then identify the elementary block under consideration as an elementary block presenting a high level of detail;

the different operations of the step consisting of determining the elementary blocks having a high level of detail are carried out for each of the color planes of the image under consideration, the elementary block under consideration being identified as an elementary block having a high level of detail if, for one of the color planes under consideration, the high-frequency component level is greater than a specific, previously determined threshold, each color plane being associated with a specific threshold;

the specific thresholds of each color plane have the same value;

the method comprises the additional steps consisting of:

applying a first type of compression to each elementary block to which said first compression type has been allocated;

applying the first compression type to each elementary block directly surrounded by two elementary blocks to which the first compression type has been allocated; the expression "directly surrounded" refers to the fact that the elementary block under consideration is adjacent to at least two lossless type elementary blocks, the two elementary blocks being situated either to the left and to the right of the elementary block under consideration, or above and below the elementary block under consideration;

the method comprises the additional step consisting of applying the first compression type to all elementary blocks of the homogeneous elementary block type;

the encoding is of the H264 encoding type.

The different additional characteristics of the method according to the invention, insofar as they are not mutually exclusive, are combined according to all combination possibilities to result in different examples of embodiment of the invention.

The invention and its various applications will be better understood upon reading the following description and examining the accompanying figures.

BRIEF DESCRIPTION OF THE FIGURES

The figures are presented for indicative purposes and in no way limit the invention.

DESCRIPTION OF PREFERRED FORMS OF EMBODIMENT OF THE INVENTION

Unless otherwise stated, the elements appearing in different figures will have retained the same references.

In the invention, one seeks to segment an image to be encoded by utilizing particular criteria to determine if each elementary block under consideration should be encoded according to a lossless compression mode or according to a lossy compression mode. The criteria defined aim to distinguish the MMI elements (buttons, menus, etc.) From the rest of the image. One essential criterion resides in the massive presence or not of text in each elementary block under consideration.

The invention proposes, first, the analysis of the spectral content of each elementary block; Such a step is justified by the fact that the text elements, in an image, are characterized by the high number of abrupt transitions in luminosity and/or chrominance. Thus, the invention proposes measuring the high frequency component level present in each elementary block for each of the three color components of the image under consideration. If the amplitude of the frequency components situated beyond a certain frequency exceeds a given threshold, the elementary block under consideration is marked as a lossless zone.

Figure 1:
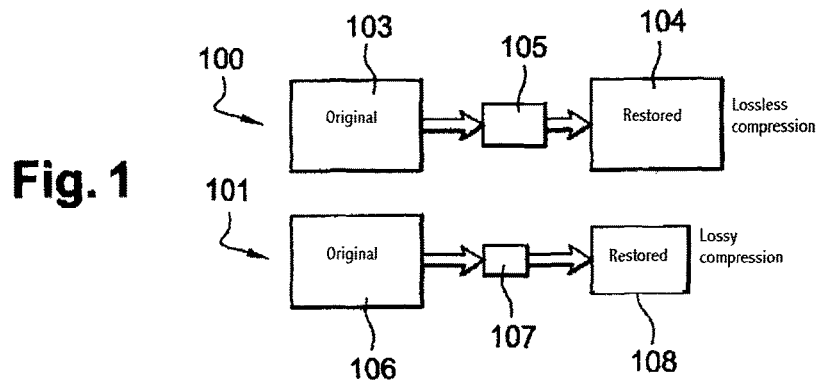
FIG. 1, already described, schematically illustrates the operation of two different compression modes.
Figure 2:
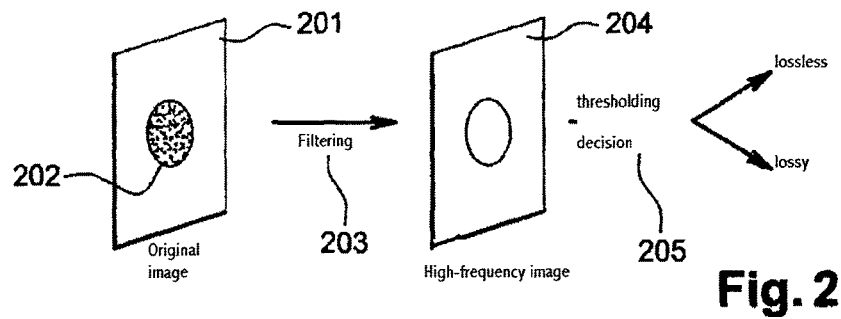
FIG. 2 schematically illustrates the encoding method according to the invention.

FIG. 2 illustrates such a principle. In this figure, an elementary block 201 containing a button type graphic element 202 is represented. First, the elementary block undergoes filtering 203, equivalent to edge detection. This is high-pass filtering allowing a high-frequency elementary block 204 to be obtained. Such filtering amplifies the abrupt variations in the image contained in the elementary block under consideration, and reduces the smooth parts, without details, of the source image. Thus, in the high-frequency elementary block, a high quantity of very bright pixels is found at the locations where there is text, or many details.

High-frequency image 204 may be obtained by a differentiation filter such as the Laplacien filter.

Secondly, a thresholding operation 205 is carried out in order to determine if the compression of the elementary block should be of the lossless or lossy type. Thus, once the high-frequency image has been calculated for the elementary block under consideration, it is necessary to mark said elementary block as lossless or lossy.

Thus, for example, the following different steps are planned:

A step of thresholding applied to the high-frequency image, where the value "1" is assigned to a pixel whose frequency value is greater than a threshold that was previously determined, advantageously empirically;

A step of counting in which the number of pixels is counted in the elementary block under consideration that were assigned the value 1 in the previous step;

A decision step: If the number obtained in the previous step is greater than a given value, determined empirically, for example, then the elementary block under consideration is marked as lossless. If not, the elementary block under consideration is marked as lossy.

Figure 3:
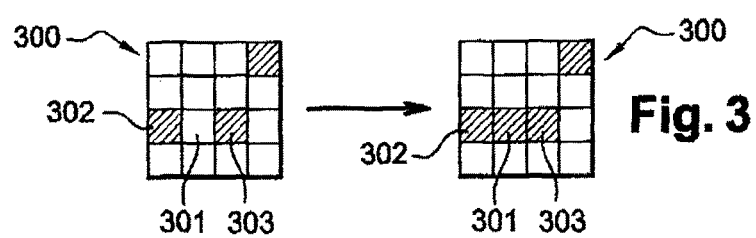
FIG. 3 illustrates an example of embodiment of the method according to the invention in which certain elementary blocks of the image to be compressed are compressed according to a lossless compression mode after placement of particular criteria for determining the compression mode.

As shown in FIG. 3, for an image 300 composed, by way of example, of 16 elementary blocks, a plurality of elementary blocks marked lossless are thus obtained, represented hatched, the other elementary blocks being marked lossy, represented unhatched.

According to a first advantageous embodiment of the invention, if an elementary block 301 is marked lossy after the thresholding operation 205, but is surrounded by a first elementary block 302 marked lossless and by a second elementary block 303 also marked lossless, finally marking elementary block 301 under consideration as lossless is expected. Thus, it will be subject to lossless compression. Such an operation improves the rendering of the image that will later be restored, by preventing too many transitions between the elementary blocks compressed in a lossless manner and the elementary blocks compressed in a lossy manner.

According to another advantageous embodiment of the method according to the invention, the homogeneous elementary blocks that have been marked lossy after the thresholding operation 205 are transformed into elementary blocks marked lossless. Homogeneous elementary block, also known as a flat zone, refers to zero-gradient zones: Such zones are characterized, for the three color components under consideration, by a null vectorial derivative along two perpendicular axes of the image under consideration.

Such a mode of embodiment also improves the rendering of the restored image, the text zones, that are thus encoded in lossless format, very often being directly surrounded by flat zones. In addition, this embodiment is not punishing in terms of the required bandwidth, the homogeneous elementary blocks, even encoded in lossless format.

Figure 4:
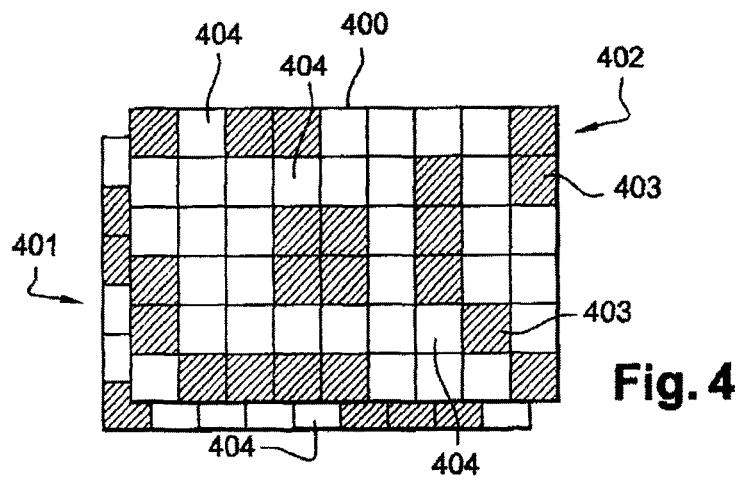
FIG. 4 illustrates an example of an image having undergone encoding by an example of embodiment of the method according to the invention.

FIG. 4 shows an image 402, composed of a first window 400 and a second window 401. Elementary blocks 403 having undergone lossless compression, represented hatched, and elementary blocks 404 having undergone lossy compression, represented unhatched, are illustrated in this figure. Image 402 has undergone the encoding method according to the invention, with the application of the embodiment of the first advantageous mode that has just been described. Thus, no lossy elementary block is disposed directly between two lossless elementary blocks.

The invention claimed is:

1. A method for encoding an image, said encoding being a mixed encoding with the possibility of using a first lossless compression type, and a second lossy compression type, said method comprising:
    dividing the image into a plurality of elementary blocks;
    determining which elementary blocks have a high level of detail;
    allocating the first type of compression to each elementary block that has a high level of detail;
    allocating the second compression type to each elementary block that does not have a high level of detail;
    applying the first type of compression to each elementary block to which said first compression type has been allocated;
    applying the first compression type to each elementary block directly surrounded by two elementary blocks to which the first compression type has been allocated.

2. The encoding method according to claim 1, wherein determining the elementary blocks having a high level of detail comprises, for each elementary block under consideration:
    performing spatial filtering to obtain a frequency representation;
    measuring a high-frequency component level of the frequency representation;
    if the high-frequency component level is greater than a previously determined threshold, identifying the elementary block under consideration as an elementary block presenting a high level of detail.

3. The encoding method according to claim 2, wherein determining the elementary blocks having a high level of detail is carried out for each of the color planes of the image under consideration, the elementary block under consideration being identified as an elementary block having a high level of detail if, for one of the color planes under consideration, the high-frequency component level is greater than a specific, previously determined threshold, each color plane being associated with a specific threshold.

4. The method according to claim 3, wherein the specific thresholds of each color plane have the same value.

5. The method according to claim 4, the method comprising:
    applying the first compression type to all elementary blocks of the homogeneous elementary block type.

6. The method according to claim 1, wherein the encoding is of the H264 encoding type.

* * * * *